(12) United States Patent
Sullivan et al.

(10) Patent No.: US 7,885,958 B2
(45) Date of Patent: Feb. 8, 2011

(54) METHOD, APPARATUS AND COMPUTER PROGRAM PRODUCT FOR ORGANIZING HIERARCHICAL INFORMATION

(75) Inventors: Andrew James Sullivan, Wappingers Falls, NY (US); Brian Trevor Denton, Rochester, MN (US); Brent Scott Elmer, Essex Junction, VT (US); Robert John Milne, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 1383 days.

(21) Appl. No.: 11/276,373

(22) Filed: Feb. 27, 2006

(65) Prior Publication Data

US 2007/0203919 A1 Aug. 30, 2007

(51) Int. Cl.
*G06F 17/30* (2006.01)
*G06F 7/00* (2006.01)

(52) U.S. Cl. .................. 707/727; 707/752; 379/80; 379/88.18

(58) Field of Classification Search ............ None
See application file for complete search history.

(56) References Cited

U.S. PATENT DOCUMENTS

| | | | |
|---|---|---|---|
| 4,982,420 A | 1/1991 | Theis | |
| 6,012,126 A * | 1/2000 | Aggarwal et al. ........... 711/133 |
| 6,016,336 A * | 1/2000 | Hanson .................... 379/88.23 |
| 6,335,964 B1 | 1/2002 | Bowater et al. | |
| 6,370,238 B1 * | 4/2002 | Sansone et al. .......... 379/88.23 |
| 6,370,375 B1 | 4/2002 | Shively | |
| 6,405,200 B1 * | 6/2002 | Heckerman .................... 707/6 |
| 6,425,060 B1 * | 7/2002 | Mounes-Toussi et al. ... 711/158 |
| 6,456,619 B1 * | 9/2002 | Sassin et al. ................. 370/356 |
| 6,487,277 B2 * | 11/2002 | Beyda et al. ............. 379/88.01 |
| 6,584,471 B1 * | 6/2003 | Maclin et al. ............ 707/104.1 |
| 6,751,306 B2 * | 6/2004 | Himmel et al. ........ 379/201.02 |
| 6,804,330 B1 | 10/2004 | Jones et al. | |
| 6,823,054 B1 * | 11/2004 | Suhm et al. .................. 379/134 |
| 6,850,949 B2 * | 2/2005 | Warner et al. ............... 707/101 |
| 6,879,685 B1 * | 4/2005 | Peterson et al. ........ 379/265.11 |
| 6,898,277 B1 * | 5/2005 | Meteer et al. .......... 379/265.02 |
| 6,922,466 B1 * | 7/2005 | Peterson et al. .......... 379/88.09 |
| 7,242,752 B2 * | 7/2007 | Chiu ....................... 379/88.04 |
| 7,286,985 B2 * | 10/2007 | Chiu .......................... 704/260 |
| 7,406,418 B2 * | 7/2008 | Chiu .......................... 704/270 |
| 7,599,861 B2 * | 10/2009 | Peterson ...................... 705/26 |

(Continued)

FOREIGN PATENT DOCUMENTS

WO 0391827 A2 11/2003

(Continued)

OTHER PUBLICATIONS

Right Now Technologies "Revelation™ Knowledge Engine", Product Brochure, Oct. 2001.*

(Continued)

*Primary Examiner*—Luke S Wassum
(74) *Attorney, Agent, or Firm*—Gibb I.P. Law Firm, LLC; Richard M. Kotulak, Esq.

(57) ABSTRACT

A method, apparatus, and computer program product for organizing hierarchical information according to a defined objective.

7 Claims, 8 Drawing Sheets

U.S. PATENT DOCUMENTS

| | | | | |
|---|---|---|---|---|
| 7,609,829 B2* | 10/2009 | Wang et al. | ............ | 379/201.01 |
| 7,643,998 B2* | 1/2010 | Yuen et al. | ................. | 704/275 |
| 2001/0014146 A1* | 8/2001 | Beyda et al. | ............. | 379/88.25 |
| 2002/0076032 A1* | 6/2002 | Rodriguez et al. | ..... | 379/266.01 |
| 2002/0146106 A1* | 10/2002 | Himmel et al. | ........ | 379/215.01 |
| 2003/0009339 A1* | 1/2003 | Yuen et al. | ................. | 704/260 |
| 2003/0014670 A1* | 1/2003 | Yuen et al. | ............... | 713/201 |
| 2003/0018476 A1* | 1/2003 | Yuen et al. | ............... | 704/270.1 |
| 2003/0161464 A1* | 8/2003 | Rodriguez et al. | ..... | 379/266.01 |
| 2003/0225730 A1* | 12/2003 | Warner et al. | ................. | 707/1 |
| 2004/0006471 A1* | 1/2004 | Chiu | ........................ | 704/260 |
| 2004/0006476 A1* | 1/2004 | Chiu | ...................... | 704/270.1 |
| 2004/0010412 A1* | 1/2004 | Chiu | ...................... | 704/270.1 |
| 2004/0225499 A1* | 11/2004 | Wang et al. | ................. | 704/257 |
| 2004/0240640 A1* | 12/2004 | Warner et al. | ............ | 379/88.18 |
| 2005/0234727 A1* | 10/2005 | Chiu | ...................... | 704/270.1 |
| 2007/0133759 A1* | 6/2007 | Malik et al. | ................... | 379/80 |
| 2008/0319733 A1* | 12/2008 | Pulz et al. | ..................... | 704/1 |

FOREIGN PATENT DOCUMENTS

| | | |
|---|---|---|
| WO | 2004071061 A1 | 8/2004 |
| WO | 2004100515 A1 | 11/2004 |

OTHER PUBLICATIONS

Suhm, B. and P. Peterson "A Data-Driven Methodology for Evaluating and Optimizing Call Center IVRs", International Journal of Speech Technology, vol. 5, No. 1, Jan. 2002, pp. 23-37.*

Brown, L. et al. "Statistical Analysis of a Telephone Call Center: A Queueing-Science Perspective", Department of Statistics, The Wharton School, University of Pennsylvania, Oct. 5, 2004.* http://riot.ieor.berkeley.edu/riot/Applications/Scheduling/algorithms.html.

* cited by examiner

METHOD, APPARATUS AND COMPUTER PROGRAM PRODUCT FOR ORGANIZING HIERARCHICAL INFORMATION

BACKGROUND

1. Technical Field of the Present Invention

The present invention generally relates to the presentation of hierarchical information, and more specifically to the organization of the hierarchical information prior to the presentation.

2. Description of Related Art

Consumers receive hierarchical information from numerous sources such as Automated Voice Response Systems (AVRS) and search engine query results. In general, AVRS are used by industries (e.g., travel, finance, health care, and the like) to direct customer inquiries to the appropriate areas of expertise while reducing the headcount for the overall infrastructure of customer support.

The number of companies with sophisticated business operations (e.g., communications, computer support and the like) that are increasingly relying on AVRS to improve productivity at call centers is skyrocketing. It has become crucial for them to develop an efficient AVRS that routes calls according to their business objectives while maintaining customer satisfaction.

Customer's satisfaction with an AVRS is directly related to the amount of time they spend on the system prior to receiving the appropriate automated activity or individual. The total amount of wait time can often be attributed to the complexity and efficiency of the AVRS design.

Currently, the design effort for much of the AVRS is done manually and fails to assign weights to routing areas. In addition, these AVRS lack the ability to dynamically adjust their routing areas according to the demand (e.g. most systems just introduce a quick message at the beginning of reaching the AVRS and leave the routing system unmodified (e.g. mail server 1023 is currently unavailable). These current design methodologies are error prone and inconsistent in their implementations.

It would, therefore, be a distinct advantage if the presentation of hierarchical information to the consumer would be organized according to the priorities of the business while maintaining efficiency of design so as to minimize the time required by the consumer to achieve his intended result. It would be further advantageous if the organization of the information could be dynamically modified according to demand.

SUMMARY OF THE PRESENT INVENTION

In one aspect, the present invention is a method of organizing hierarchical information for a service. The method includes the step of organizing the hierarchical information into groups and end-items. The method also includes the step of determining potential combinations, according to an objective function, of the groups and end-items that implement the service. In addition, the method includes the step of selecting the potential combination that has the best objective function value.

BRIEF DESCRIPTION OF THE DRAWINGS

The present invention will be better understood and its advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

The present invention is a method, apparatus, and computer program product for organizing information in a hierarchical sequence according to weighted priorities.

In a preferred embodiment of the present invention, an AVRS uses weighted priorities for organizing the presentation of hierarchical information and includes the ability to dynamically re-organize the organization according to actual demand.

In an alternative preferred embodiment of the present invention, a search engine uses weighted priorities for organizing the manner in which the search results are displayed and includes the ability to dynamically adjust the search results according to actual viewing or hits.

In general, selectable hierarchical information can be communicated to a user audibly (e.g., voice, music, tones), visually (e.g., computer monitor, kiosk, wireless laptop, television, P.D.A., cell phone), or sensory (e.g., vibration, Braille). The user can indicate his selection through various input devices such as audio, visual and/or mechanical.

Preferred Embodiment (AVRS)

A typical AVRS audibly communicates possible selections to a user who can indicate his selection by pressing a corresponding number on the pad of a device such as a telephone. An example of a portion of such a system is explained in connection with FIG. 1 below.

Figure 1:
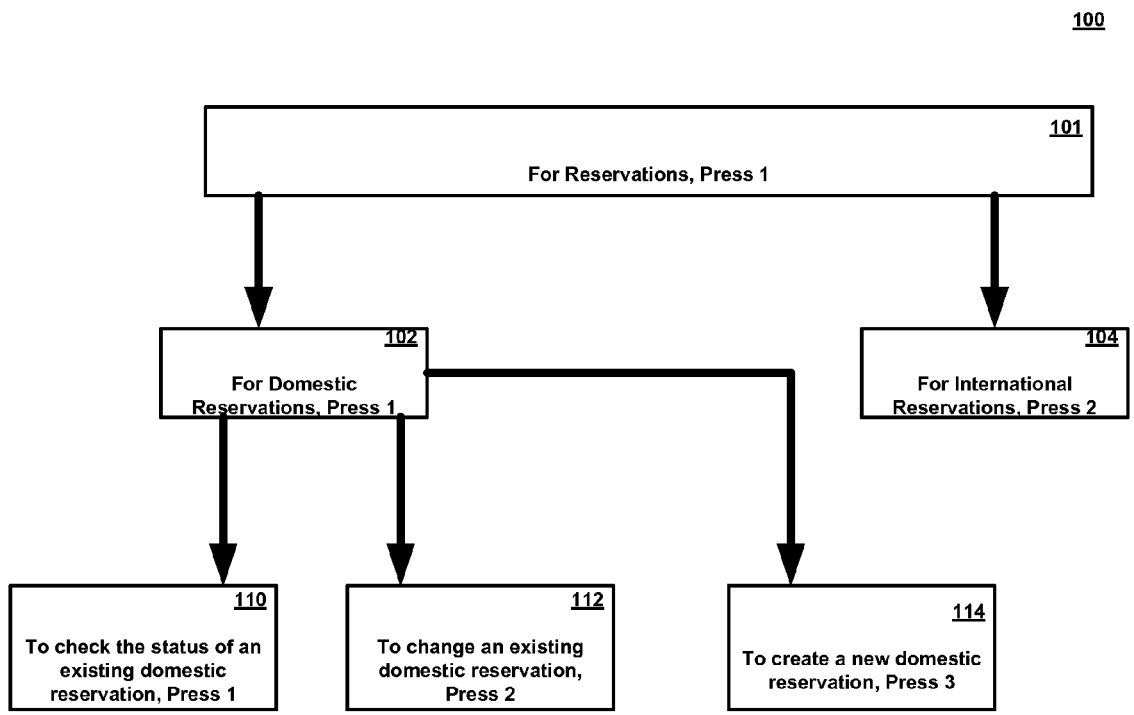
FIG. 1 is a diagram illustrating an example of a hierarchical organization that can be used for a portion of an audible AVRS of a travel agency.

Reference now being made to FIG. 1, a diagram is shown illustrating an example of a hierarchical organization 100 that can be used for a portion of an audible AVRS of a travel agency. The hierarchical organization 100 includes attribute groups 101-104, and end-items 110-114. Attribute group 101 represents the main entry point for reservations in the AVRS and includes the audible informational prompt "For Reservations, press 1". If the customer presses "1" they are presented with attribute groups 102 and 104 having audible informational prompts "For Domestic Reservations, Press 1" and "For International Reservations, Press 2", respectively.

End-items 110-114 are part of the attribute group 102 and include audible informational prompts "To check the status of an existing domestic reservation, Press 1", "To change an existing domestic reservation, Press 2", and "To create a new domestic reservation, Press 3", respectively.

This type of hierarchical tree-like structure is referred to hereafter as routing since it routes or guides the customer through the hierarchy to find the desired service or other item.

Figure 2:
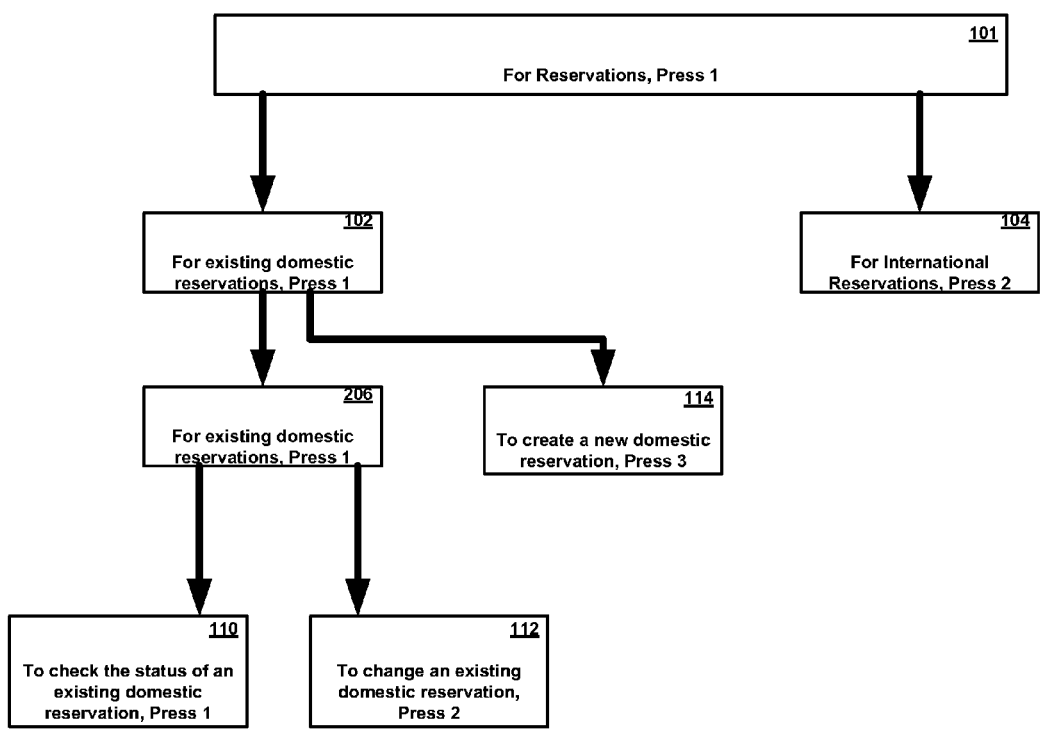
FIG. 2 is a diagram illustrating an alternative implementation for the hierarchical organization structure of FIG. 1.

Reference now being made to FIG. 2, a diagram is shown illustrating an alternative implementation for the hierarchical organization structure 100 of FIG. 1. The organizational structure of FIG. 2 is based upon the realization that both end-items 110 and 112 concern an existing domestic reservation. More specifically, group attribute 206 with informational prompt "For existing domestic reservations, Press 1" has been inserted as a member of group attribute 102 and as a parent of end-items 110 and 112.

Whether the routing suggested by FIG. 1 is preferable to the alternative routing of FIG. 2 depends on the underlying parameters and objective of the organization providing the service. For example, one business objective in designing the AVRS routing may be to minimize the average time that a customer waits before pressing the button leading to the desired service. However, the organization providing the service and designing the routing may have a preference for low wait times on certain services (e.g., those leading to higher profits). Consequently, the objective may be to minimize the weighted average customer waiting time where the weights are chosen to reflect the importance (as perceived by the organization) of the service desired by the customer.

Figure 3:
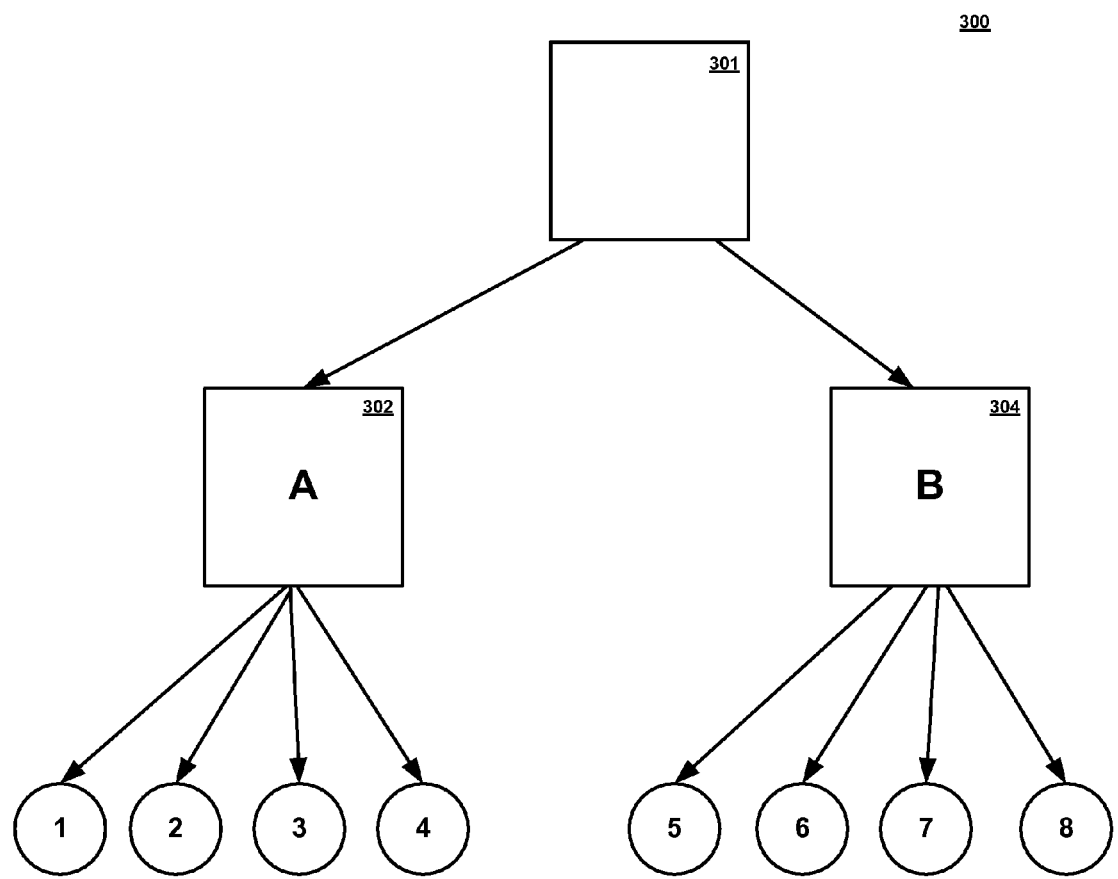
FIGS. 3 and 4 are diagrams representing an example of hierarchical organizations that can be implemented by an AVRS.
Figure 4:
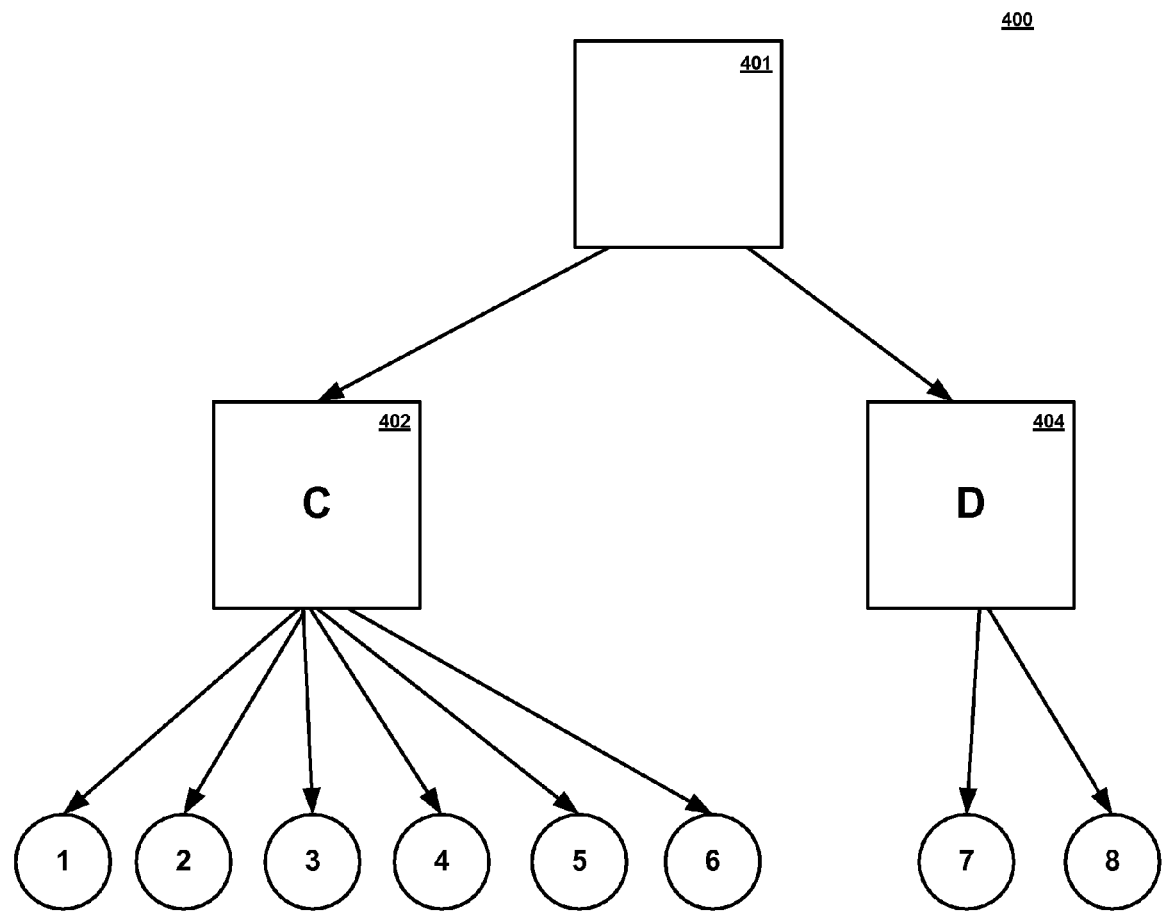

Reference now being made to FIGS. 3 and 4, each are diagrams representing an example of hierarchical organizations 300 and 400 that can be implemented by an AVRS. Hierarchical organization structure 300 includes attribute groups 301, A 302 and B 304 and end-items 1-8 (FIG. 3). Hierarchical organization structure 400 includes attribute groups 401, C 402 and D 404 and end-items 1-8.

For this example, it can be assumed that the informational prompts for attribute groups A 302, B 304, C 402, D 404, and end-items 1-8 each take one second to prompt, and further presume that each of the end-items 1-8 is equally important from the perspective of the organization providing the service. In this case, the hierarchical organization (routing) 300 of FIG. 3 is preferable to the hierarchical organization 400 of FIG. 4.

Ignoring the time it takes the customer to respond, the time to reach the Nth end-item 1-8 according to the design of FIG. 3 is 2, 3, 4, and 5 seconds for N=1, 2, 3, and 4 respectively, and 3, 4, 5, and 6 seconds for N=5, 6, 7, and 8, respectively. The average time for reaching an Nth end-item in the hierarchical design 300 is four seconds (=2+3+4+5+3+4+5+6/8). For example, a customer that desires to reach end-item 7 must wait one second each for attribute groups A 302, B 302, and end-items 5, 6, and 7 informational prompts to be presented for a total of five seconds.

Again, ignoring the time it takes a customer to respond, the time taken to reach the Nth end-item is 2, 3, 4, 5, 6, and 7 for N=1, 2, 3, 4, 5, and 6, respectively and 3 and 4 for N=7 and 8, respectively for an average time of 4.25 seconds (=2+3+4+5+6+7+3+4/8) for the hierarchical organization 400 (FIG. 4).

The hierarchical organization 300 is more effective because the end-items 1-8 are spread more evenly (balanced) in attribute groups A 302 and B 304 when compared to attribute groups C 402 and D 404 (FIG. 4).

The hierarchical organization (routing design) can be solved mathematically. For purposes of illustration, but not limitation, the initial description of the problem is formulated primarily from the perspective of an AVRS application. The end-items i in set I represent atomic prompts which connect the customer (or other end user) directly to the service they desire. These end-items can be thought of as "leaves" at the bottom of a tree-like structure. An end-item can be a member of one or more attribute groups.

An attribute group is a parent of a set of end-items and/or other attribute groups. All non-end-item nodes in the hierarchical structure are attribute groups. Attribute groups may be defined according to a variety of characteristics such as geography, time, form, function, categories, or sub-categories of product or particular service. A conventional math programming formulation is provided below in a form familiar to those practiced in the art (i.e. definitions of subscripts, input data, decision variables, objective, and constraints of the problem).

Subscripts:

i: subscript for end-item (leaf) service types/prompts g: subscript referencing a collection of service types which may be grouped into an attribute group. note: g includes a "dummy" root grouping applicable to all services n: subscript for nodes which may be end-items or groups k: subscript indicating the ordinal position of a prompt (node) in a series of prompts (for example, in FIG. 1, attribute group 114 is in the $3^{rd}$ ordinal position since it follows attribute groups 110 & 112)

f: subscript for a node earlier than the kth position at a given hierarchical level h: subscript indicating the hierarchical level of a prompt in the AVRS routing (for example, in FIG. 1, attribute groups 101 and 102, and end-item 112 are at levels 1, 2, and 3, respectively)

Input Data:

I: set of all (atomic) end-items i

G: set of all potential attribute groups g

N: set of all nodes in a potential routing hierarchy=Union of sets I and G $D_i$: relative demand for requests of end-item i $C_i$: cost per unit time of a customer requesting end-item i (used to indicate some service requests should be satisfied more quickly than others)

$TS_n$: time to ask the customer whether they want end-item n or to select attribute group n TR: average time for a customer to select and respond to a prompt (after hearing and/or reading it)

$S_{ng}=1$ if end-item n or attribute group n may be differentiated according to attribute group g in other words, this indicates if node n may have attribute group g as a parent in the routing note that this includes the possibilities of attribute groups as members of attribute groups (e.g., group of cities in VT; group of states in U.S.; group of countries in N. America)

note also that $S_{ng}=1$ when n=g

=0 otherwise

Decision Variables:

$Y_{nkh}=1$ if end-item n or attribute group n is the kth prompt at hierarchical prompt level h =0 otherwise Objective Function: Minimize total cost weighted average waiting time:

$$\Sigma_{i\ in\ I} C_i * D_i * TT_i / \Sigma_{i\ in\ I} D_i$$

Where decision variable $TT_i$=total time a customer spends on the AVRS call to get to end-item i Note: since $\Sigma_{i\ in\ I} D_i$ is a constant, it is convenient to minimize the equivalent objective: Minimize: $\Sigma_{i\ in\ I} C_i * D_i * TT_i$ Constraints:

(i) Only one prompt at a time: $\Sigma_{n\ in\ N} Y_{nkh} <= 1$ for all k, h (ii) Each end-item prompt is covered: $\Sigma_k \Sigma_h Y_{ikh} >= 1$ for all i in I (iii) Path to each node: $\Sigma_k Y_{nkh} <= S_{ng} * \Sigma_j Y_{gj(h-1)}$ for all h; all n in N; for some g in G (iv) Accumulate times: $TT_n >= Y_{nkh} * [TT_{(h-1)} + TR + \Sigma_{j<=k} \Sigma_{f\ in\ N} TS_f * Y_{fjh}]$ for all k, h, n (v) Binary Constraint: $Y_{nkh}$ are all binary variables (0 or 1)

Figure 5:
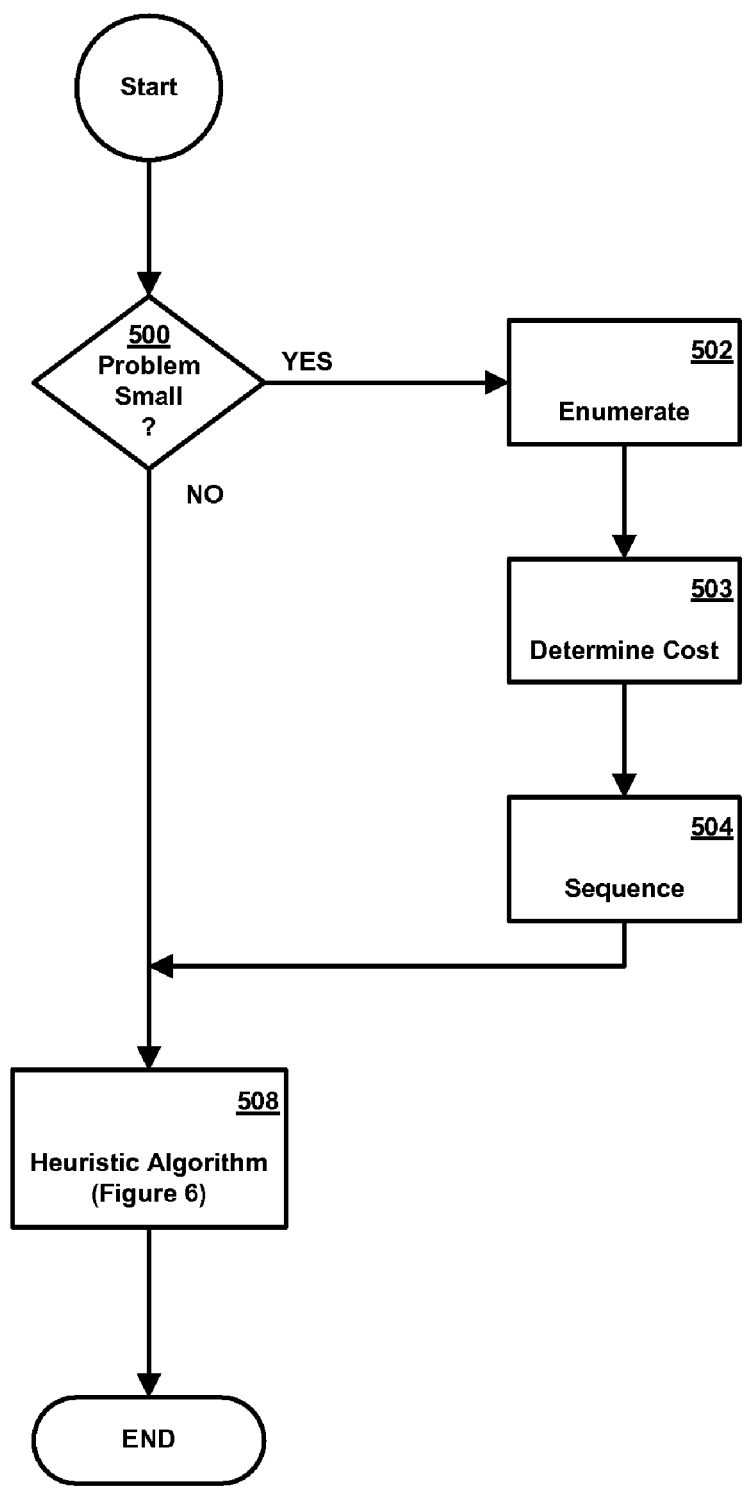
FIG. 5 is a flow chart illustrating a method for organizing hierarchical information according to a preferred embodiment of the present invention.

Reference now being made to FIG. 5, a flow chart is shown illustrating a method for organizing hierarchical information according to a preferred embodiment of the present invention. The process begins by analyzing the size and complexity of the routing problem to see if it exceeds a predetermined size (Step 500). In the preferred embodiment, this is accomplished by comparing a weighted length to a predetermined size (parameter1). The weighted length is equal to I_length (the number of elements in the set of end-items I)+attribute_weighting multiplied by G_length (the number of elements in the set of possible attribute groups G).

In the preferred embodiment of the present invention, the attribute_weighting variable is a number that is larger than unity since the number of possible attribute groupings influences problem size and complexity more than the number of end-item prompts. The value of parameter1 should be chosen so that the process will execute in a reasonable duration of time. Generally speaking, the larger the value of parameter1 the longer the execution time and the better the resulting routing design.

If the weighted_length is less than parameter1, then the problem is considered small and enumeration is used (Step 502); otherwise a heuristic algorithm is used (Step 508 as explained in greater detail in connection with FIG. 6).

Enumeration is used to enumerate all possible combinations of attribute groupings and to select the best combination (i.e., the routing that will minimize the total cost as defined in the objective function) (Step 502). The objective function can be to minimize total weighted average customer waiting time (as expressed above) or it can be an alternative objective function. In the travel reservation example, enumerating all possible combinations of attribute groupings would include examination of the value of the objective function in the event that the hierarchical organization 100 of FIG. 1 is selected and examining the value of the objective function in the event that the hierarchical design 200 of FIG. 2 is selected.

The cost or value of the object function will determine the selection of the combination (Step 503). In the present example, the grouping that results in the best objective function value will determine the hierarchical organization 100 or 200 that is selected. It should be noted, that only feasible combinations are enumerated. If any combination of groupings results in more than a predetermined number (parameter2) of prompts at a given level of the hierarchy, it is not considered feasible.

In the AVRS preferred embodiment, the value of parameter2 may be set to nine since there are nine single digit nonzero numbers on most telephones. In the context of a visual display (e.g. on a P.D.A.), it may (or may not) be desirable to have a value of parameter2 that limits groupings to those that can be entirely displayed and viewable on a single screen without scrolling.

A step of the enumeration can result in a list of prompts (nodes) that can be invoked together at a given level of the hierarchy. In this case, these nodes are sorted in ascending sequence of the node's service time/node denominator (Step 504). In the case of a node being an end-item prompt, its service time is Tsi and its denominator is demand frequency multiplied by its cost of waiting (Di*C). In the case of a node being an attribute group, its service time is TSg and its denominator the sum of (Di*Ci) summed over all end-item prompts i underneath (i.e., leaf descendants of) that attribute group g.

Figure 6:
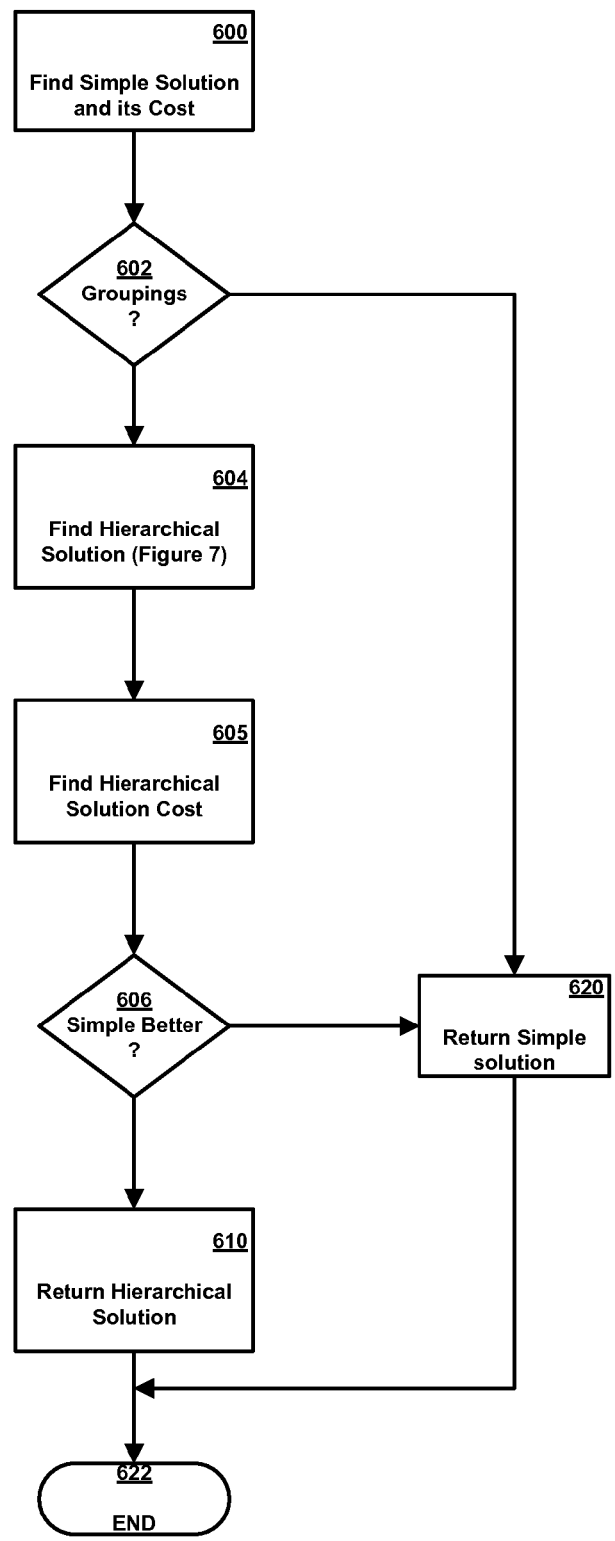
FIG. 6 is a flow chart illustrating a method for performing the heuristic algorithm of FIG. 5 according to the teachings of the preferred embodiment of the present invention.

Reference now being made to FIG. 6, a flow chart is shown illustrating the method for performing the heuristic algorithm of FIG. 5 according to the teachings of the preferred embodiment of the present invention. The heuristic algorithm begins with determining an initial simple solution by sorting the end-item prompts into the same ascending sequence as determined for a small problem as previously described in connection with FIG. 5 (Step 504).

In addition, the cost associated with the simple solution is also determined. If the number of end-items exceeds parameter2, then the cost of the simple solution is set to infinity (in practice, infinity is approximated by a large number); otherwise, in the preferred embodiment, the cost of the simple solution is determined by the equation (Step 600):

$$\text{cost\_of\_simple\_soln} = \Sigma_{atomic\ elements\ i\ in\ simple\ solution} C_i * D_i * \Sigma_{k=1\ to\ i} TS_k$$

The heuristic algorithm continues by determining whether or not it is possible to create a hierarchical organization from the end-items (Step 602). If there are combinations of groupings that will create a feasible hierarchical organization, then a hierarchical organization solution is processed (Step 604 as explained in greater detail in connection with FIG. 7 below); otherwise the simple solution and its accompanying cost are used as the solution to the routing design problem (Steps 620 and 622).

After the hierarchical organization solution has been determined, the heuristic algorithm continues by determining the cost of the hierarchical organization found according to the objective function in a fashion similar to that explained in connection with the cost of the simple solution of FIG. 5 (Step 605).

The heuristic algorithm continues by determining whether the simple solution has a lower cost than the hierarchical organization solution (Step 606). If the simple solution is less costly, then the simple solution and its accompanying cost are used as the solution to the routing design problem and the process ends (Steps 620 and 622); Otherwise, the hierarchical solution and its cost are used as the solution to the routing design problem and the process ends (Steps 610 and 622).

Figure 7:
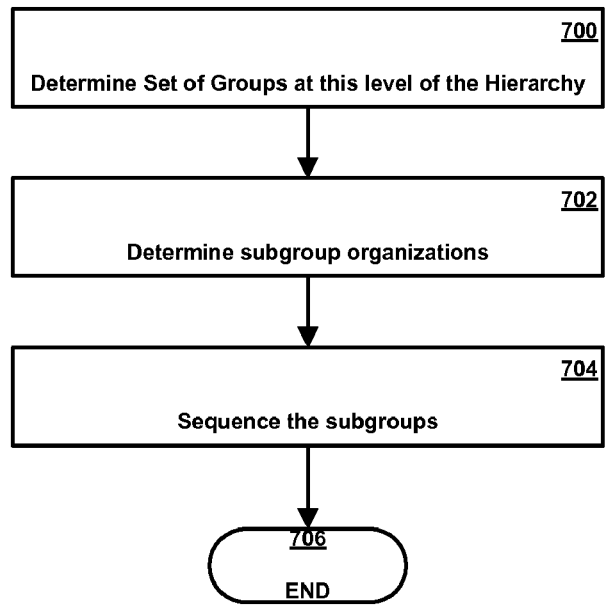
FIG. 7 is a flow chart illustrating a method for the hierarchical solution of FIG. 6 according to the teachings of the preferred embodiment of the present invention.

Reference now being made to FIG. 7, a flow chart is shown illustrating the method for the hierarchical solution of FIG. 6 according to the teachings of the preferred embodiment of the present invention. The hierarchical solution processes the problem from the top of the hierarchy and proceeds downwards. In other words, the method first determines the prompts to provide to the customer at the top level of the hierarchy and proceeds downwards to deeper levels.

The hierarchical solution begins by selecting a set of attribute groups that are of approximate equal size at this top level of the hierarchy. In example, the balanced set of hierarchical grouping (302 and 304) of FIG. 3 would be selected over the set of alternative hierarchical grouping (402 and 404) of FIG. 4. More precisely, the hierarchical solution will find the set s of nodes (to be used at the current level of the hierarchy) which has the largest value of $(\text{ratio\_size}_s)^{factor}/\text{ratio\_prompts}_s$ //balance group size evenness and #prompts
where $$\text{ratio\_size}_s = (\text{MIN}_{g\ in\ s} \Sigma_{i\ s.t.\ Sig=1} C_i * D_i * TS_i)$$

/

$$(\text{MAX}_{g\ in\ s} \Sigma_{i\ s.t.\ Sig=1} C_i * D_i * TS_i)$$

$$\text{ratio\_prompts}_s = (TR + \Sigma_{n\ s.t.\ Sng=1\ for\ g\ in\ s\ and\ no\ w\ s.t.\ Snw*Swg=1\ for\ w\ not\ n\ or\ g} TS_n)$$

$$/\text{MAX}_s(TR + \Sigma_{n\ s.t.\ Sng=1\ for\ g\ in\ s\ and\ no\ w\ s.t.\ Snw*Swg=1\ for\ w\ not\ n\ or\ g} TS_n)$$

and factor is chosen to balance the importance of even sizes vs. number of prompts The factor should be more (less) than unity if evenness is more (less) important than minimizing the number and duration of the prompts of a set s.t.

$\Sigma_{g\ in\ set\ s} S_{ig} = 1$ for all i in list //i.e. all services covered and s is chosen so that there are less than parameter2 number of values i s.t.

$S_{ig}=1$ for g in s and there is no w s.t. $S_{iw} * S_{wg} = 1$ for w not equal i or g The ratio_size indicates the degree of conformity of attribute group size within a set, and is calculated as the ratio of the number of end-items in the set's attribute group with the fewest end-items as compared to the number of end-items in the attribute group with the most end-items (i.e. smallest to largest).

In example of the above process, the set of attribute groups in FIG. 3 would have a ratio_size of unity (4/4) while the ratio_size of the set of attribute groups in FIG. 4 would have a ratio_size of 0.33 (2/6). Thus, sets of attribute groupings with high size ratios (balanced sets) are favored in this process. The formula also favors sets that do not require the customer to listen to many long duration prompts or scan through a long list of end-items. This is indicated by the ratio_prompts which is essentially the ratio of the service time weighted number of prompts in the set to the highest service time weighted number of prompts of any feasible set examined. In calculating ratio_prompts, only those prompts of a set at the current level of the hierarchy are considered.

The value of ratio_prompts is unity for the worst set in this respect (i.e. the set with many and long duration prompts) and between zero and unity for the others. The ratio_size is also between zero and unity.

At a given hierarchical level, the preferred embodiment selects the set that has the highest value of ratio_size$^{factor}$ divided by ratio_prompt. The factor is a parameter used to balance the desire to have equal size groups with the desire to have few and short prompts. A factor of unity weights the two elements equally while a factor above unity favors the equality of size and a factor below unity favors the number and duration of the prompts. Finally, the "s.t." (such that) element in the above formula ensures that only sets which cover all services and a limited number prompts are considered (i.e., only feasible sets).

After a set of attribute groups has been selected for a given level of hierarchy, the prompts of the deeper levels of the overall hierarchy are determined. Specifically, the routing organization underneath each of the current level prompts is processed by invoking the heuristic algorithm of FIG. 6 recursively by passing it a sub-problem which consists only of those end-items contained as descendants of each current level prompt and their correspondingly applicable potential attribute groupings. That is, for each group g a member of chosen set s, heuristic algorithm will receive a set of all services i such that $S_{ig}=1$ and a set of groups w s.t. $S_{iw}=1$ for some i in the set of services and there is no j s.t. $S_{jw}=1$ for j not in the set of services (Step 702).

The subgroups are sorted in the manner suggested by the above discussion concerning step 504 and the process ends (Steps 704 and 706).

In addition to the core algorithm summarized above, the preferred embodiment includes a monitoring method. This method measures actual customer AVRS activity on a real time basis. The purpose of this monitoring is to determine whether or not a fundamental (although perhaps temporary) shift has occurred in the underlying customer demand frequencies. Such shifts will cause a re-execution of the core algorithm with more recent demand activity weighted more heavily and a new AVRS routing instituted automatically.

For example, an airport shutdown may result in increased demand for "change existing reservation", and thus, this prompt may be sequenced earlier in the revised routing. Other examples of events triggering demand changes include reactions to: news events, advertisements/promotions (including those of competitors), editorials, time of day, day of year, etc. In addition to updating the AVRS routing, human intervention can occur when appropriate. It should be noted, that the monitoring aspect of the preferred embodiment is extremely powerful when combined with the core algorithm so that new routings may be determined quickly and automatically based on real time changes in demand.

In addition, the underlying demand distributions may be globally applicable or tailored to a set of clients. For example, Europeans may have a different demand frequency pattern than Americans, and thus, should be provided with a different AVRS routing (i.e., different hierarchical sequence of prompts). In an extreme form, the AVRS could be tailored to an individual based heavily on the individual's history but also reflective of the broader customer population.

Figure 8:
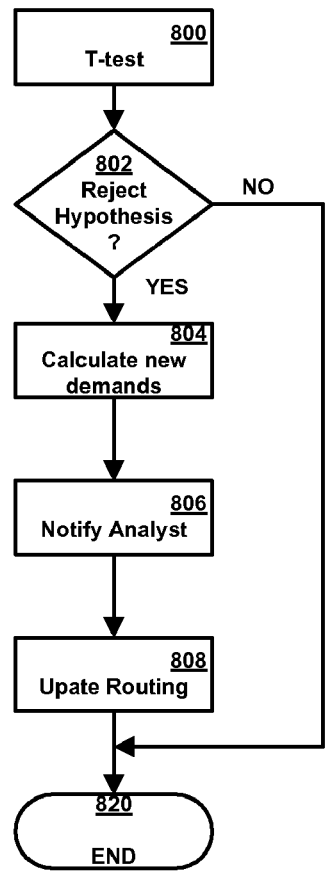
FIG. 8 is a flow chart illustrating a method for monitoring and altering the hierarchical organization of an AVRS according to the teachings of a preferred embodiment of the present invention.

Reference now being made to FIG. 8, a flow chart is shown illustrating a method for monitoring and altering the hierarchical organization of an AVRS according to the teachings of a preferred embodiment of the present invention. The method begins by monitoring the real-time stream of customer demands using the statistical "t test" which is a well known and understood process, and therefore, further discussion deemed unnecessary. The "t test" is used for testing the null hypothesis that no significant change has occurred in the underlying mean frequency of each demand type (Step 800).

If the result of the "t-test" indicates that the null hypothesis should be rejected, then the method proceeds to re-calculate the hierarchical organization; otherwise the method ends (Step 820).

The recalculation begins by estimating the point in time when the new demand stream became apparent and calculating new demand frequencies that can be weighted more heavily toward recent demands, particularly those occurring since the point in time when the new demand stream became apparent (Step 804).

Optionally, the method can send a notification message to a consumer analyst that the demand frequency has changed (Step 806).

The method proceeds by recalculating the hierarchical organization with the new weights according to the method described in connection with FIG. 5 (Steps 808 and 820). Depending on the rules, this can be done automatically, upon specific approval, or only for selected customers. For instance, customers who have used the prior routing hierarchical structure may prefer to leave this structure in tact, since they are accustomed to the old routing.

Alternative Preferred Embodiment (Search Engine)

In an alternative preferred embodiment of the present invention, the hierarchical organization method is applied to a search engine such as a web or catalog search engine. Specifically, the search engine results can be organized using the organization and sequence method described above in connection with the routing method of FIG. 5.

The mathematical variables associated with FIG. 5 have been reformulated as noted below to represent the search engine embodiment:

I: set of all end items that can be displayed to the user ("items" may be web site links from a search engine such as Google™ or sales items from an online commerce catalog such as Amazon™ as examples). In contrast to an AVRS where every desired service (end-item) must be reachable, the search engine does not need to provide all possible end-items implied by the search query. Consequently, I represents the set of end-items which the search engine provider desires to make displayable to the user (i.e., items with very low likelihood of demand can be ignored).

G: set of all attribute groups. Attribute groups can be defined through manual categorization or determined automatically by finding similarities among the end-items. The similarities can be based partially upon similar and/or identical keywords (or meanings of keywords) shared among end-items, or based upon frequency of pairs of end-items selected/clicked historically.

$D_i$: relative demand for requests of end-item i (based on historical frequency of request or other search engine-like techniques such as number of web sites which link to end-item i)

$C_i$: cost per item displayed (e.g., for a search engine this can be unity for all items, and for catalog this figure may reflect the book's profit margin)

$TS_i$: time for the customer to read end-item i (this can be based on the number of characters in the node which may be a book or category of books as examples)

TR: time for the user to click and wait for a response to his or her click (this time begins when the user becomes mentally aware of which item he wants to select, continues through the click and new display on the screen, and concludes when the browser or other mechanism begins waiting for new user input).

$S_{ng}$ is mapped in a similar manner to the determination of the set of all attribute groups G.

The search engine embodiment provides the above information to the routing algorithm FIG. 5 after receiving the search criteria from the customer/user and conducting its existing art search. Subsequently, the resulting hierarchical organization is displayed to the customer/user.

It should be noted, that the displayed information can be a mixture of hierarchical and nonhierarchical information which may or may not be separated and distinct.

Figure 9:
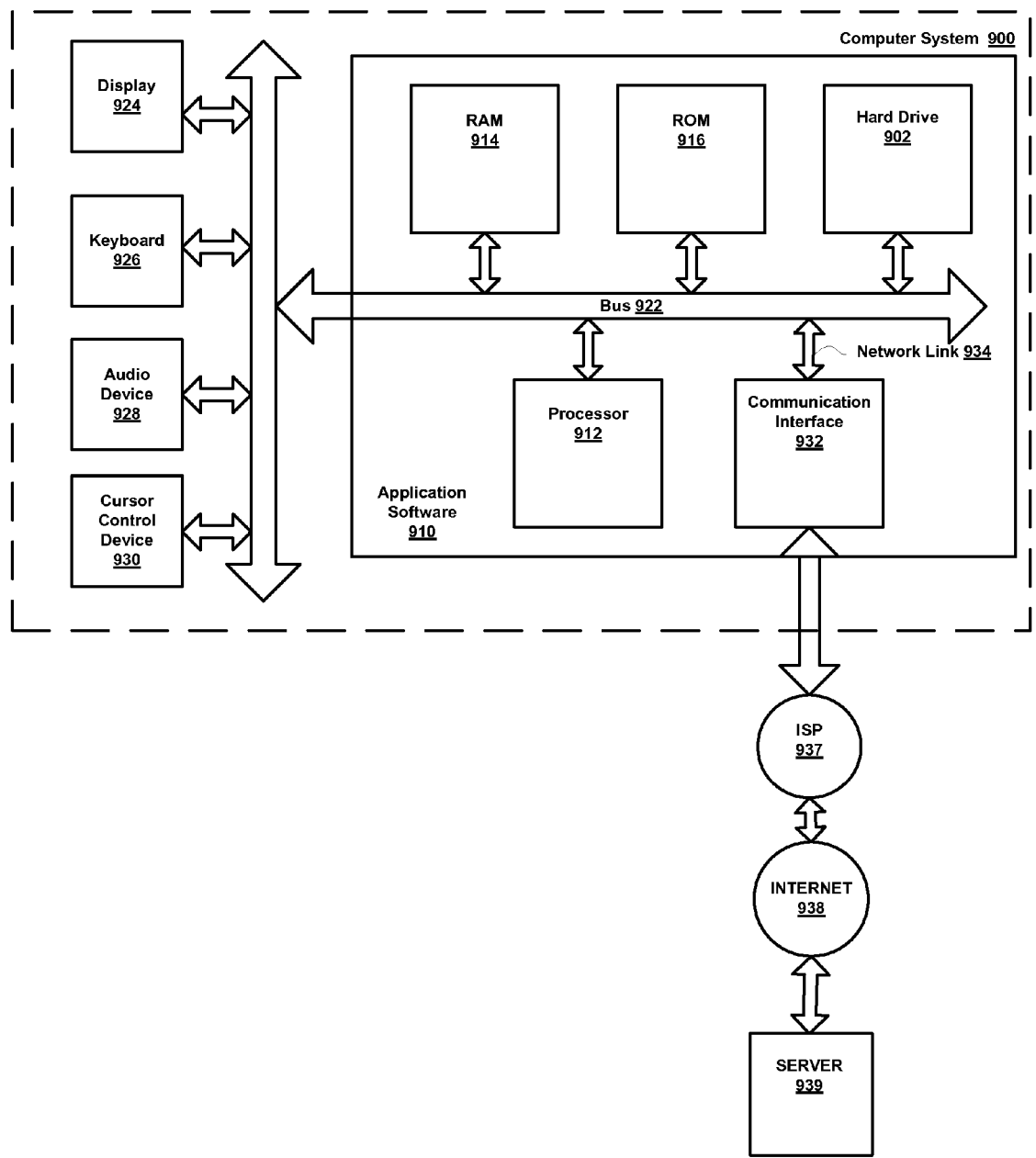
FIG. 9 is a block diagram illustrating a computer system that can perform the hierarchical organization method explained in connection with FIGS. 5-8.

Reference now being made to FIG. 9, a block diagram is shown illustrating a computer system 900 that can perform the hierarchical organization method explained in connection with FIGS. 5-8 above. Computer System 900 includes various components each of which are explained in greater detail below.

Bus 922 represents any type of device capable of providing communication of information within Computer System 900 (e.g., System bus, PCI bus, cross-bar switch, etc.)

Processor 912 can be a general-purpose processor (e.g., the PowerPC™ manufactured by IBM or the Pentium™ manufactured by Intel) that, during normal operation, processes data under the control of an operating system and application software 910 stored in a dynamic storage device such as Random Access Memory (RAM) 914 and a static storage device such as Read Only Memory (ROM) 916. The operating system preferably provides a graphical user interface (GUI) to the user.

The present invention, including the alternative preferred embodiments, can be provided as a computer program product, included on a machine-readable medium having stored on it machine executable instructions used to program computer system 900 to perform a process according to the teachings of the present invention.

The term "machine-readable medium" as used in the specification includes any medium that participates in providing instructions to processor 912 or other components of computer system 900 for execution. Such a medium can take many forms including, but not limited to, non-volatile media, and transmission media. Common forms of non-volatile media include, for example, a floppy disk, a flexible disk, a hard disk, magnetic tape, or any other magnetic medium, a Compact Disk ROM (CD-ROM), a Digital Video Disk-ROM (DVD-ROM) or any other optical medium whether static or rewriteable (e.g., CDRW and DVD RW), punch cards or any other physical medium with patterns of holes, a programmable ROM (PROM), an erasable PROM (EPROM), electrically EPROM (EEPROM), a flash memory, any other memory chip or cartridge, or any other medium from which computer system 900 can read and which is suitable for storing instructions. In the preferred embodiment, an example of a non-volatile medium is the Hard Drive 902.

Volatile media includes dynamic memory such as RAM 914. Transmission media includes coaxial cables, copper wire or fiber optics, including the wires that comprise the bus 922. Transmission media can also take the form of acoustic or light waves, such as those generated during radio wave or infrared data communications.

Moreover, the present invention can be downloaded as a computer program product where the program instructions can be transferred from a remote computer such as server 939 to requesting computer system 900 by way of data signals embodied in a carrier wave or other propagation medium via network link 934 (e.g., a modem or network connection) to a communications interface 932 coupled to bus 922.

Communications interface 932 provides a two-way data communications coupling to network link 934 that can be connected, for example, to a Local Area Network (LAN), Wide Area Network (WAN), or as shown, directly to an Internet Service Provider (ISP) 937. In particular, network link 934 may provide wired and/or wireless network communications to one or more networks.

ISP 937 in turn provides data communication services through the Internet 938 or other network. Internet 938 may refer to the worldwide collection of networks and gateways that use a particular protocol, such as Transmission Control Protocol (TCP) and Internet Protocol (IP), to communicate with one another. ISP 937 and Internet 938 both use electrical, electromagnetic, or optical signals that carry digital or analog data streams. The signals through the various networks and the signals on network link 934 and through communication interface 932, which carry the digital or analog data to and from computer system 900, are exemplary forms of carrier waves transporting the information.

In addition, multiple peripheral components can be added to computer system 900. For example, audio device 928 is attached to bus 922 for controlling audio output. A display 924 is also attached to bus 922 for providing visual, tactile or other graphical representation formats. Display 924 can include both non-transparent surfaces, such as monitors, and transparent surfaces, such as headset sunglasses or vehicle windshield displays.

A keyboard 926 and cursor control device 930, such as mouse, trackball, or cursor direction keys, are coupled to bus 922 as interfaces for user inputs to computer system 900.

The execution of application software 910 on computer system 900 implements the hierarchical organization as explained above in connection with FIGS. 5-8 and is preferably programmed in Java and/or C/C++. It should be noted and understood by those of ordinary skill in the art, however, that the present invention is not limited to the above implementation and is independent of any computer/system architecture. Accordingly, the present invention may equally be implemented on other computing platforms, programming languages and operating systems, and also may be hardwired into a circuit or other computational component.

It is thus believed that the operation and construction of the present invention will be apparent from the foregoing description. While the method and system shown and described has been characterized as being preferred, it will be readily apparent that various changes and/or modifications could be made without departing from the spirit and scope of the present invention as defined in the following claims.

What is claimed is:

1. A computer-implemented method of organizing hierarchical information for a service, the method comprising:
   organizing, by a computing device, the hierarchical information into combinations of attribute groupings comprising of node attribute groups and node end-item prompts;
   sorting, by said computing device, said combinations of attribute groupings in an ascending sequence based on:
      end-item prompt node values equal to end-item prompt node service time values divided by a product of end-item prompt node demand frequency values and end-item prompt node cost of waiting values; and
      attribute group node values equal to attribute group node service time values divided by a sum of all of said a products of end-item prompt node demand frequency values and end-item prompt node cost of waiting values that descend from each attribute group node;
   determining, by said computing device, according to an objective function, potential combinations of the combinations of attribute groupings that implement the service; and
   selecting, by said computing device, a potential combination of said potential combinations that has a best objective function value based on a relationship between:
      a ratio of a number of end-item prompts in one potential attribute group set with a least number of end-item prompts as compared to a number of end-item prompts in another attribute group set with a greatest number of end-item prompts; and
      a ratio of service time weighted number of prompts in the set to the highest service time weighted number of prompts of any feasible set,
   where said objective function comprises minimizing a total weighted average customer waiting time.

2. The method of claim 1, further comprising:
   assigning, by said computing device, each of the potential combinations a value that reflects their placement within the other potential combinations according to the objective function.

3. The method of claim 1 wherein the service is an automated response service.

4. The method of claim 1 wherein the service is a search engine.

5. An apparatus for organizing hierarchical information for a service, the apparatus comprising:
   a processor organizing the hierarchical information into combinations of attribute groupings comprising of node attribute groups and node end-item prompts;
   said processor sorting said combinations of attribute groupings in an ascending sequence based on:
      end-item prompt node values equal to end-item prompt node service time values divided by a product of end-item prompt node demand frequency values and end-item prompt node cost of waiting values; and
      attribute group node values equal to attribute group node service time values divided by a sum of all of said a products of end-item prompt node demand frequency values and end-item prompt node cost of waiting values that descend from each attribute group node;
   said processor determining according to an objective function, potential combinations of the combinations of attribute groupings that implement the service; and
   said processor selecting a potential combination of said potential combinations that has a best objective function value based on a relationship between:
      a ratio of a number of end-item prompts in one potential attribute group set with a least number of end-item prompts as compared to a number of end-item prompts in another attribute group set with a greatest number of end-item prompts; and
      a ratio of service time weighted number of prompts in the set to the highest service time weighted number of prompts of any feasible set,
   where said objective function comprises minimizing a total weighted average customer waiting time.

6. The apparatus of claim 5, further comprising:
   said processor assigning each of the potential combinations a value that reflects their placement within the other potential combinations according to the objective function.

7. A computer storage medium readable by a computer tangibly embodying a program of instructions executable by said computer for performing a method for organizing hierarchical information for a service, the method comprising:
   organizing the hierarchical information into combinations of attribute groupings comprising of node attribute groups and node end-item prompts;
   sorting said combinations of attribute groupings in an ascending sequence based on:
      end-item prompt node values equal to end-item prompt node service time values divided by a product of end-item prompt node demand frequency values and end-item prompt node cost of waiting values; and
      attribute group node values equal to attribute group node service time values divided by a sum of all of said a products of end-item prompt node demand frequency values and end-item prompt node cost of waiting values that descend from each attribute group node;

determining according to an objective function, potential combinations of the combinations of attribute groupings that implement the service; and selecting a potential combination of said potential combinations that has a best objective function value based on a relationship between:

a ratio of a number of end-item prompts in one potential attribute group set with a least number of end-item prompts as compared to a number of end-item prompts in another attribute group set with a greatest number of end-item prompts; and a ratio of service time weighted number of prompts in the set to the highest service time weighted number of prompts of any feasible set, where said objective function comprises minimizing a total weighted average customer waiting time.

* * * * *